April 7, 1931.     H. A. THRUSH     1,800,185
PRESSURE RELIEF VALVE
Filed Sept. 6, 1928
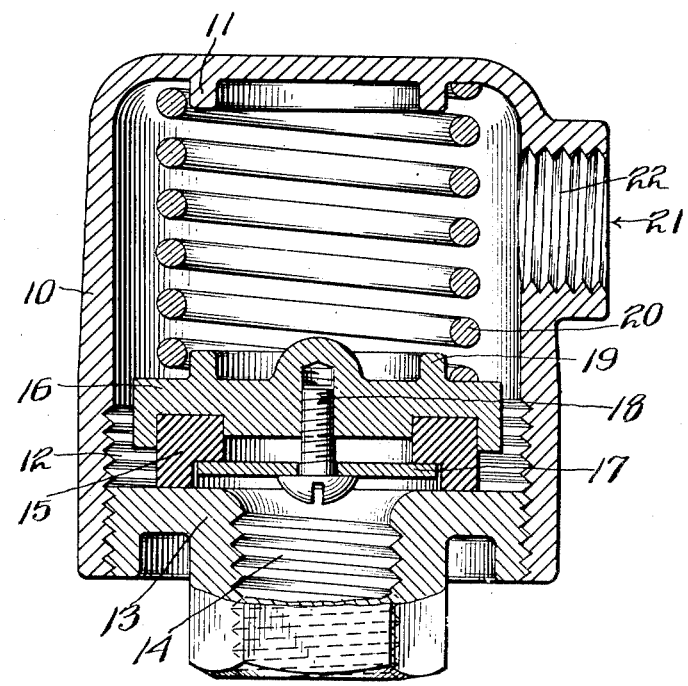
Inventor
Homer A. Thrush
By
Attorney Patented Apr. 7, 1931

1,800,185

UNITED STATES PATENT OFFICE

HOMER A. THRUSH, OF PERU, INDIANA

PRESSURE RELIEF VALVE

Application filed September 6, 1928. Serial No. 304,299.

My invention relates to pressure relief valves. It is an object of the invention to provide a simple valve which will yield under a predetermined high pressure as a safety valve.

A further object of the invention is to provide simple adjusting means for controlling the pressure at which the valve yields.

Referring to the accompanying drawings, which are made a part hereof and on which similar reference characters indicate similar parts, The figure shows a vertical sectional view of the valve.

In the drawings, numeral 10 indicates a cup-like casing having an annular ridge 11 on its interior at one end and having the interior of its other end screw-threaded at 12. A plug 13 is screwed into the threads 12. This plug itself is threaded at 14 to receive screw threads on a pipe or the like. The plug 13 provides a valve seat for a valve which comprises an annular resilient member or gasket 15 which is held between a member 16 and a washer 17 by means of a screw 18. The screw serves also to distort the gasket. The resilient ring 15 is adapted to seat upon the plug 13 and provide a fluidtight engagement therewith. The member 16 is provided on its upper portion with an annular ridge 19. A compression spring 20 has its ends positioned around the annular portion 11 and the annular portion 19 and tends to urge the valve 15 upon its seat.

The tension of the valve 20 may be varied by turning the plug 13 to move it inwardly or outwardly in the screw threads 12 in the end of the cup-like casing.

The casing 10 is provided at its upper portion with an outlet 21 which may be internally screw-threaded at 22 to receive a pipe for carrying off fluid which has passed through the valve.

The operation of the valve should be obvious. The screw threaded portion 14 is in communication with fluid under pressure. When the pressure exceeds a predetermined amount the spring 20 yields and allows the fluid to escape around the valve 16 and out through the exhaust port 21 to the atmosphere or to any other point to which it may be desired to deliver it. The pressure at which the valve yields may be controlled within predetermined limits by screwing plug 13 in or out to vary the tension of the spring 20.

It will be obvious to those skilled in the art that various changes may be made in my device without departing from the spirit of the invention, and I, therefore, do not limit myself to what is shown in the drawings and described in the specification, but only as set forth in the appended claim.

Having thus fully described my said invention, what I claim as new and desire to secure by Letters Patent, is:

A valve comprising an inverted cup-shaped casing, a fluid outlet in said casing, an annular ridge within the closed end of said casing, an adjustable valve seat screw-threaded into the open end of said casing and containing the inlet port, a disc valve within said casing provided with an annular upstanding ridge, a compression spring retained in place by said valve ridge and said casing ridge for forcing said valve closed, an annular circular groove in the under side of said disc valve, an annular valve gasket adapted to fit into said circular groove, a disc washer mounted within said gasket, and a screw passing through said washer and entering said disc valve for distorting the gasket and holding it in position, substantially as set forth.

In witness whereof, I have hereunto set my hand at Peru, Indiana, this 28th day of August, A. D. nineteen hundred and twenty-eight.

HOMER A. THRUSH.